Sept. 20, 1932.  R. C. DANLY  1,878,820
FEEDING MECHANISM
Filed Nov. 4, 1931  2 Sheets-Sheet 2
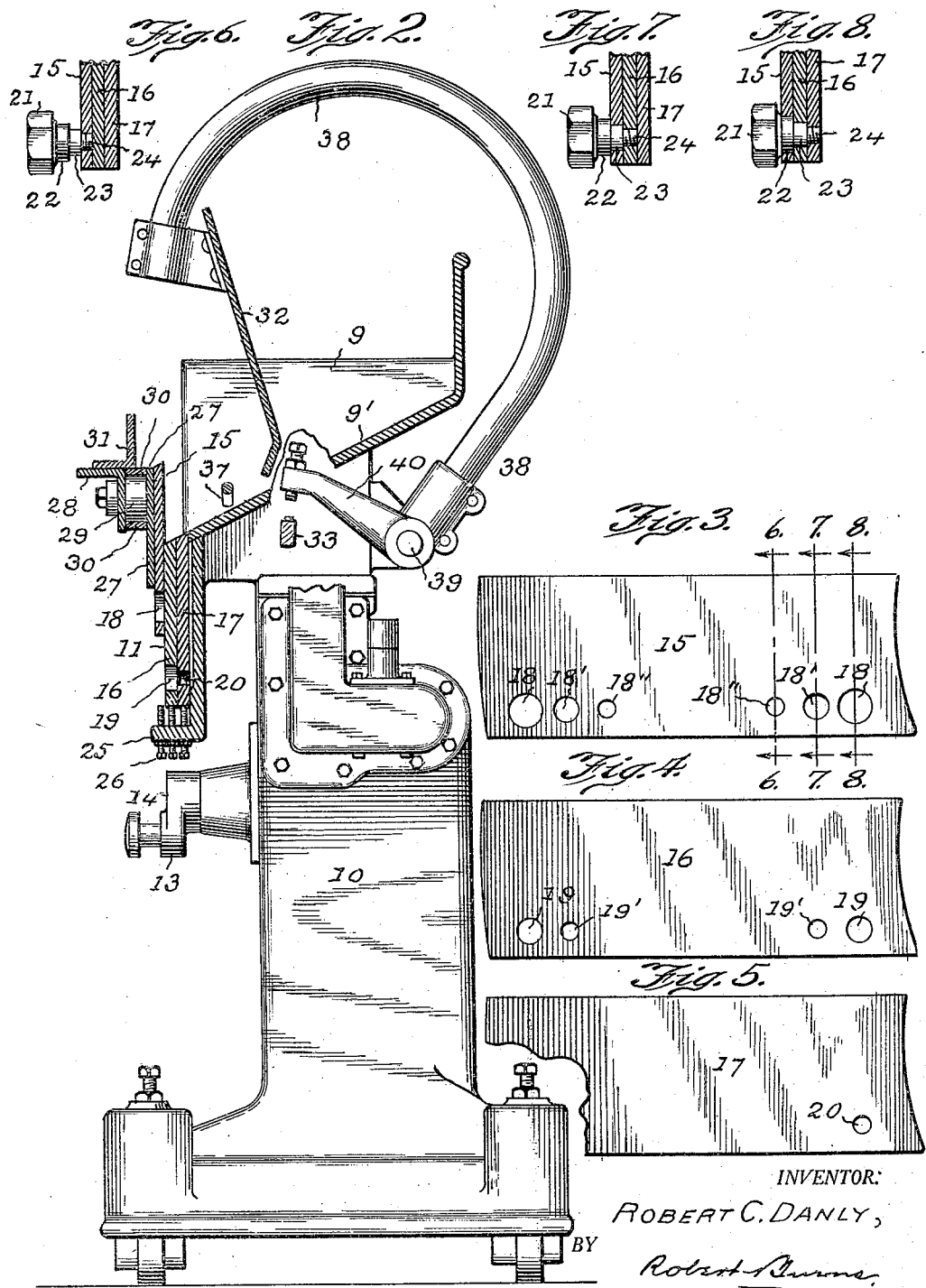
INVENTOR:
ROBERT C. DANLY,
BY
ATTORNEY.

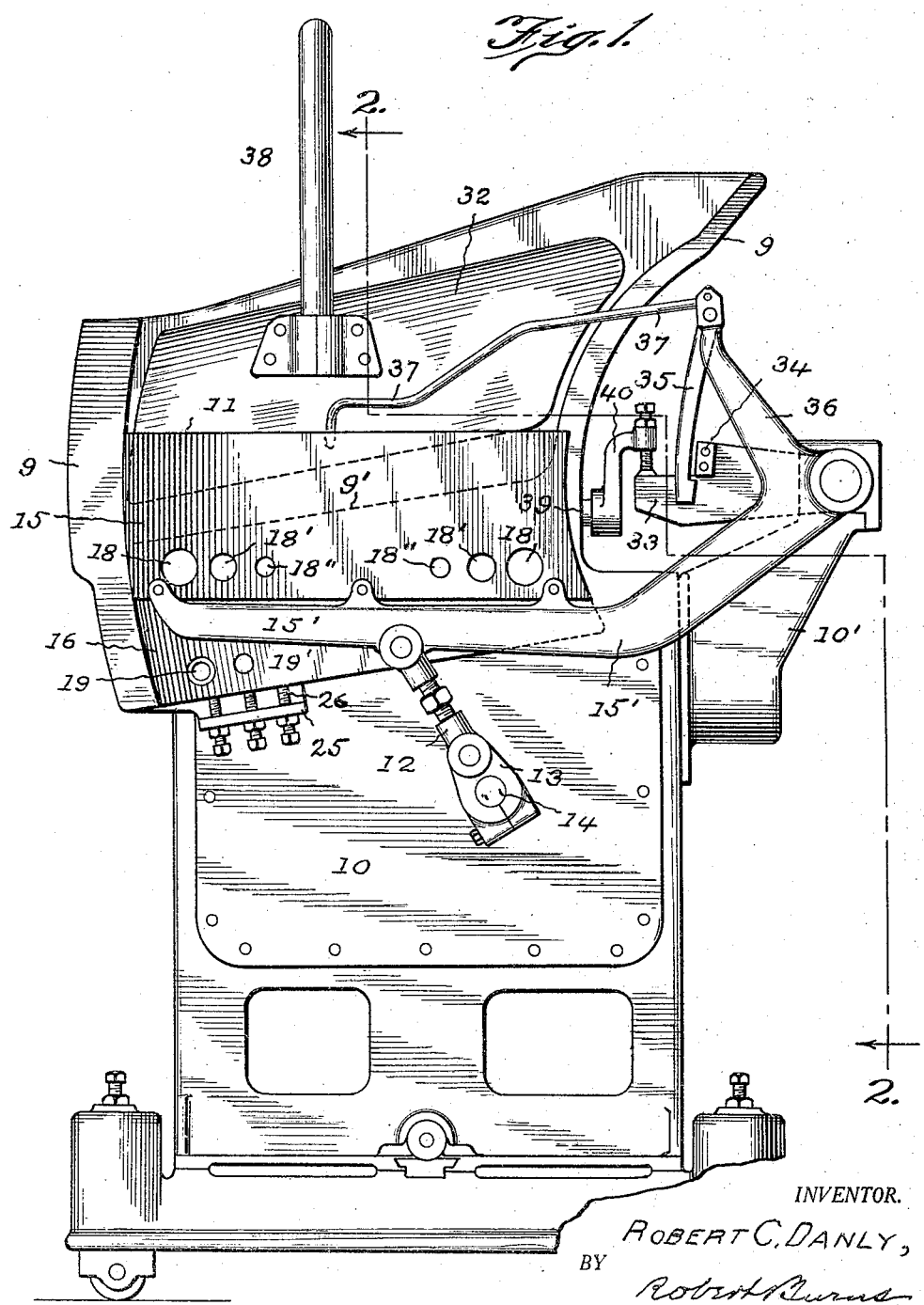

Patented Sept. 20, 1932

1,878,820

UNITED STATES PATENT OFFICE

ROBERT C. DANLY, OF CHICAGO, ILLINOIS, ASSIGNOR TO DANLY MACHINE SPECIALTIES, INC., OF CHICAGO, ILLINOIS, A CORPORATION OF ILLINOIS

FEEDING MECHANISM

Application filed November 4, 1931. Serial No. 572,956.

This invention relates to that class of hopper feed mechanisms which serially select cylindrical objects from a holding hopper and deliver the same in like serial manner to a conveyor for delivery to the associated machine for a finishing or like operation, an example of such feeding mechanism constituting the subject matter of my prior Patent No. 1,828,597, dated October 20th, 1931. And this improvement has for its various objects:

To provide a structural formation and combination of parts of a holding hopper having a bottom wall which slants downward towards an outlet opening of the hopper, an associated serially operating selector mechanism in operative relation to the outlet opening in the hopper, and a stop gate or partition adapted for rising and falling movements in relation to the slanting bottom of the hopper and arranged at a point removed from the selector mechanism and adapted to permit an occasional and limited flow of the hopper contents towards the selector mechanism and maintain an even layer of the hopper contents on that part of the bottom wall of the hopper between said gate and said selector mechanism and so insure a regulated and effective feeding operation of the selector mechanism.

To provide in connection with the above mentioned stop gate an automatically operating means adapted with the occurrence of a bare portion on the bottom wall of the hopper due to the removal of portions of the even layer of objects thereon, to effect a rising movement of the gate and a limited down flow of the hopper contents to replenish a required even layer of such contents between the stop gate and selector mechanism, and with such replenishment attained permit a falling movement of the gate to prevent excess down flow of the hopper contents.

To provide a structural formation and combination of parts of the selector mechanism and associated holding hopper, whereby a ready change can be effected in the association of the selector slides of said mechanism to adapt the same to select and feed only a given size of the articles from the holding hopper while effectively rejecting any larger sizes of such articles.

To provide in connection with the selector mechanism above referred to, an endless carrier adapted to serially receive the articles from the selector mechanism, with such endless carrier having associated means for maintaining the articles in end to end alignment as they are carried away from said selector mechanism, all as will hereinafter more fully appear.

In the accompanying drawings:

Fig. 1 is a side elevation embodying the preferred form of the invention, the associated endless carrier mechanism being omitted with a view to better illustration of the selector mechanism.

Fig. 2 is a transverse section on line 2—2 Fig. 1.

Fig. 3 is a detail elevation of the primary slide of the selector mechanism.

Fig. 4 is a like view of the next adjacent slide of such mechanism.

Fig. 5 is a like view of the next adjacent and innermost slide of the mechanism.

Fig. 6 is a detail transverse section on line 6—6 Fig. 3, showing an associated relation of selector slides in which the outer and primary slide is solely adapted for active selective operation.

Fig. 7 is a similar view on line 7—7 Fig. 3, showing the primary and next adjacent slide fixedly connected together for active selective operation.

Fig. 8 is a similar view on line 8—8 Fig. 3, showing the three selector slides connected together for active selective operation.

Like reference numerals indicate like parts in the several views.

In the construction shown, the holding hopper 9 for the unfinished articles that are to be serially selected and fed to an associated finishing apparatus, is mounted on a portable supporting base 10, adapted for rigid attachment to the carrying frame of a centerless grinding machine or the like with a view to maintain proper operative relation between the two mechanisms. In the present construction the bottom wall 9' of the hopper 9 is of a downward slanting formation in a transverse direction to the open front or outlet passage of the hopper, and in the preferred construction shown in Fig. 1, said bottom wall is also of a slanting formation towards one end of the hopper.

Associated with the open front or outlet of the hopper, a vertically moving selector unit 11 is arranged, with the hereinafter described selector slides of the unit, when the same is in its down position with top edge of the slides in receiving relation to the lower edge of the bottom wall 9' of the hopper. With the selector unit in its up position the top edge of said slides are in delivery relation to the hereinafter described endless carrier unit by which the articles from the selector unit are carried and delivered to the associated finishing apparatus. In the preferred construction shown, the selector unit is of the oscillatory type shown in my aforesaid Patent No. 1,828,597, and is pivotally mounted on the supporting base 10 to receive motion through a link 12 from a crank arm 13 on the driving shaft 14 of the feeding mechanism, as shown in Fig. 1.

A material part of this invention involves a construction of the selector unit 11 in a sectional form comprising a series of substantially counterpart slides 15, 16 and 17 of a flat plate formation in side by side relation as shown in Fig. 3, with the outermost slide 15 being the only one which receives direct oscillation from the driving mechanism just described, and to such end is fixedly attached to a vibratory arm 15' pivotally mounted on a side bracket 10' of the supporting base 10. The remaining slides 16 and 17 of the series are adapted for serial attachment to said outer or primary slide 15 so as to move in unison therewith and when so desired preferably by the coupling means now to be described.

In the example shown, the outer slide 15 is formed with a series of orifices 18, 18' and 18'' of progressively decreasing diameters, with the smaller orifices 18'' screw threaded for holding engagement with the reduced and screw threaded inner end of the hereinafter described coupling bolt.

The next inner slide 16 is formed with a pair of orifices 19 and 19' of progressively decreasing diameters, and which are in aligned relation with the orifices 18 and 18' of the aforesaid outer slide 15, and are of the same diameters as the orifices 18, 18' of the outer slide 15, with the orifice 19' screw threaded for engagement with the screw threaded reduced end of the above mentioned coupling bolt.

The next and innermost slide 17 of the series is formed with a single orifice 20, in aligned relation to the orifices 18 and 19 of the slides 15, 16, said orifice 20 being screw threaded for engagement with the screw threaded inner end of the coupling bolt above referred to.

The coupling bolt above referred to, comprises an outer operating head 21 and a series of progressively reduced inner portions 22, 23 and 24, the respective diameters are the same as the diameters of the orifices 18, 18' and 18'' of the outer slide 15 aforesaid, with the innermost portion 24 screw threaded for selective engagement in either of the screw threaded orifices 18'', 19', 20, of the slides 15, 16 and 17.

With the above described construction, and with the screw threaded end 24 of the coupling bolt in engagement in the screw threaded orifice 18'' of the outer slide 15, as shown in Fig. 6, the bolt is conveniently carried in an inactive condition, and the slide 15 will receive direct oscillatory movement from the crank arm 13 independent of the remaining slides 16 and 17 of the series, and will operate to select and feed a predetermined smaller size of articles from the holding hopper to the endless conveyor of the mechanism.

With the offset portion 23 of the coupling bolt in the orifice 18' of the outer slide 15, and the inner screw threaded portion 24 of said bolt in engagement with the screw threaded orifice 19' of the slide 16, as shown in Fig. 7, the two slides 15, 16, are fixedly attached together to move in unison and select and feed a predetermined large size of articles from the holding hopper to the endless conveyor of the mechanism.

With the offset portion 22 of the coupling bolt in the orifice 18 of the slide, the offset portion 23 in the orifice 19 of the slide 16, and the screw threaded portion 24 of the bolt in engagement with the orifice 20 of the slide 17, as shown in Fig. 8, all three slides are fixedly attached together to move in unison and select and feed a predetermined still larger size of the articles from the holding hopper to the endless conveyor of the mechanism.

The top faces of the selector slides 15, 16 and 17 are of a beveled formation corresponding with the slant of the bottom wall 9' of the holding hopper to form a plane extension of the same with said slides in their down position. Said beveled formation of the slides are adapted in addition to attain a more effective lifting engagement with the articles in a selection and transfer of the same from the hopper to the endless conveyor of the mechanism.

A bracket flange 25 on the supporting base 10 is located beneath the series of slides 15, 16 and 17 and carries a series of adjustable abutment screws 26 by means of which the proper relation between the top edges of the series of slides and the adjacent edge of the bottom wall 9' of the hopper is attained with said slides in their down position.

It is within the scope of the invention to either increase or decrease the number of slides 15, 16 and 17 as circumstances may direct in the production of a mechanism of greater or less capacity.

The endless conveyor of the mechanism extends in front of the holding hopper 9, the full length of the same, and in adjacent relation to a fixed and vertically arranged breast plate 27 on the supporting base 10, with the upper edge of the breast plate in a horizontal plane a short distance below the plane of that of the top edge of the selector slide 15 as it reaches the end of its upward stroke and so that the article selected and raised by the slide may drop onto the endless conveyor now to be described.

In spaced and parallel relation to the breast plate 27 aforesaid, a companion rail 28 of an angle form in cross section is fixedly secured, and between said rail and said breast plate each end carrying sheave 29 of a flat surface endless belt 30 of any usual detail formation, is journalled, with the upper face of the endless belt a distance below the top edge of the breast plate, as shown in Fig. 2, so that the upper part of said breast plate will constitute a side retaining guide for the articles carried on the conveyor.

In the above described construction, the horizontal top flange of the rail 28 forms a support for a longitudinally extending adjustable guide rail 31, of an angle formation in cross section, and adapted to provide in connection with the opposed upper part of breast plate 27 means for retaining the articles in proper position upon the endless belt.

Another material part of the invention involves a rising and falling stop gate 32 of a plate form arranged in the hopper chamber a distance back of the selector mechanism at the front of the hopper and adapted in its rising movement to permit a passage of a limited flow of the articles in the main chamber of the hopper, to that portion of the hopper bottom 9' between the gate and the selector mechanism, and afford an even layer of the articles for successive engagement by such selective mechanism.

The rising and falling movement of the stop gate 32, above referred to, is preferably attained in an automatic manner by mechanism connecting the gate to the operating mechanism of selector mechanism, with the intermediate mechanism shown comprising parts as follows:—

A free oscillating arm 33 is journalled on the same pivot axis as that of the vibratory carrying arm 15' of the selector slide 15, and is provided at its free end with a detent 34 for operative engagement with a depending pawl arm 35 pivoted in the free end of an upright extension 36 of the carrying arm 15' aforesaid. In the construction shown, the depending pawl arm 35 is fixedly attached to one end of the hereinafter described feeler finger or prong 37, and the arrangement is such that with the pawl arm 35 in engagement with the detent 34 of the oscillatory arm 33, motion will be imparted to said oscillatory arm in unison with the vibratory movement of the carrying arm 15' of the selector mechanism, with such oscillatory movement of the arm 33 adapted in turn to impart through the mechanism hereinafter described the desired rising movement to the stop gate 32.

The feeler finger 37, above referred to, extends into the hopper chamber at a point intermediate of the stop gate and the selector mechanism aforesaid, and under normal conditions is adapted to rest upon a layer of the articles on the bottom wall 9' of the hopper in proximity to the selector mechanism, and in such position maintain the depending pawl 35 out of engagement with the detent 34 of the oscillatory arm 33, leaving the same in an inactive condition. On a gradual removal of the aforesaid layer of articles by the selector mechanism, a portion of the hopper bottom is laid bare permitting a downward movement of the feeler finger 37 onto said bare portion of the hopper bottom.

With such downward movement of the feeler finger 37, it acts to move the associated depending pawl 35 into operative engagement with the detent 34 of the oscillatory arm 33, and impart active movement thereto, with such active movement of the oscillatory arm in turn, imparting a rising movement to the stop gate 32 through a construction and arrangement of parts as follows:—

A curved arm 38 is fixedly secured at one end to the stop gate 32 to constitute a means of support therefor, and at its other end said curved arm is fixedly attached to a rock shaft 39 journalled at the rear of the holding hopper 9, as shown in Fig. 2, with said rock shaft carrying in turn an operating arm 40 extending into the path of the oscillatory arm 33, heretofore described, so as to receive movement therefrom in the active condition of said oscillatory arm 33 and thus effect the desired rising movement to the stop gate 32 and a replenishment of the layer of articles adjacent to the selector mechanism.

Having thus fully described my invention, what I claim as new, is:—

1. In a feeding mechanism of the type described, the combination of a holding hopper formed with a front outlet and with a bottom slanting downwardly to said outlet, a selector mechanism moving in front of said outlet and comprising a series of separate selector slides adapted for coupling together in series, means for imparting direct movement to the outermost of said slides independent of the remainder of said slides, and means for receiving the hopper contents as the same is removed by said selector mechanism.

2. In a feeding mechanism as specified in claim 1, and wherein an oscillatory movement is imparted to the selector mechanism by a rotary crank arm and intermediate link connection.

3. In a feeding mechanism as specified in claim 1, and wherein direct movement is imparted to the outermost of the series of selector slides, with means for selectively coupling the other slides to said outermost slide.

4. In a feeding mechanism as specified in claim 1 and wherein the series of selector slides are adapted to be selectively connected together by a coupling bolt formed with a series of reduced portions adapted for engagement in a series of orifices in the selector slides of a diameter corresponding with the diameters of the reduced portions of the coupling bolt.

5. In a feeding mechanism as specified in claim 1 and wherein the inner reduced portion of a coupling bolt between the selector plates is screw threaded and the smaller orifices of the selector slides are correspondingly screw threaded for engagement with said reduced end.

6. In a feeding mechanism as specified in claim 1, and wherein the means for serially receiving the articles from the selective mechanism comprises a breast plate arranged in front of the selector slides of said mechanism, a longitudinal rail arranged in fixed and spaced relation to said breast plate, carrying sheaves journalled between said breast plate and said rail, an endless conveyor belt mounted on said sheaves with its top surface on a plane beneath the top edge of said breast plate.

7. In a feeding mechanism as specified in claim 1 and wherein the longitudinal rail aforesaid is of a right angle form in cross section, and having a horizontal top flange and a longitudinal guide member adjustably attached to said top flange.

8. In a feeding mechanism of the type described, the combination of a holding hopper formed with a front outlet and with a bottom slanting downwardly to said outlet, a selective mechanism moving in front of said outlet, a rising and falling stop gate arranged within the hopper in spaced relation to said selector mechanism, and means for imparting a rising movement to said gate to permit a limited flow of the hopper contents towards the selector mechanism.

9. In a feeding mechanism as specified in claim 8, and wherein the rising mechanism of the stop gate is automatically effected by an intermediate mechanism controlled by an associated feeler finger adapted to rest on an underlying portion of the hopper contents and in the absence of any of such underlying contents render such intermediate mechanism active in effecting a rising movement of the stop gate.

10. In a feeding mechanism as specified in claim 8, and wherein the gate raising mechanism comprises a rock shaft, a curved arm carrying the gate and fixed on said rock shaft, a fixed rock arm on said rock shaft, a free oscillatory arm on the machine base with its free end in operative relation to the rock arm of said rock shaft, a feeler finger controlled by the contents of the feeding hopper and adapted in its movement in one direction to effect engagement between said oscillatory arm and the operating mechanism of the selector plates.

11. In a feeding mechanism as specified in claim 8, and wherein the means for imparting a rising movement to the gate comprises a rock shaft, an arm thereon carrying the gate, a second arm having a free end fixed on said rock shaft, a vibratory arm moving in unison with the selector plates and formed with an upright extension, a depending pawl pivoted in said extension, a feeler finger operatively associated with the contents of the holding hopper and having operative connection with said pawl, said pawl in its movement in one direction acting to effect operative engagement between the aforesaid arm of the selector plates and the free end of the arm of the rock shaft and its movement in the opposite direction to release such engagement.

In testimony whereof I hereunto affix my signature.

ROBERT C. DANLY.